(12) United States Patent
Liu et al.

(10) Patent No.: US 8,667,328 B2
(45) Date of Patent: Mar. 4, 2014

(54) SYSTEM AND METHOD FOR PROTECTING WINDOWS SYSTEM STATE

(75) Inventors: Victor Liu, Beijing (CN); Jinqiang Wang, Beijing (CN); Peter Peng, Beijing (CN)

(73) Assignee: CA, Inc., Islandia, NY (US)

( * ) Notice: Subject to any disclaimer, the term of this patent is extended or adjusted under 35 U.S.C. 154(b) by 546 days.

(21) Appl. No.: 12/431,335

(22) Filed: Apr. 28, 2009

(65) Prior Publication Data

US 2010/0275060 A1    Oct. 28, 2010

(51) Int. Cl.
*G06F 21/00*    (2013.01)

(52) U.S. Cl.
USPC .............................. 714/15; 711/161; 711/162

(58) Field of Classification Search
CPC ............ G06F 11/1471; G06F 11/1469; G06F 11/1451; G06F 2201/83
USPC .............................. 713/165; 714/15; 711/162
See application file for complete search history.

(56) References Cited

U.S. PATENT DOCUMENTS

| | | | |
|---|---|---|---|
| 5,765,173 A * | 6/1998 | Cane et al. | 707/640 |
| 6,785,786 B1 * | 8/2004 | Gold et al. | 711/162 |
| 6,820,214 B1 * | 11/2004 | Cabrera et al. | 714/15 |
| 2004/0143713 A1 * | 7/2004 | Niles et al. | 711/162 |

OTHER PUBLICATIONS

Microsoft TechNet, How Volume Shadow Copy Service Works, Microsoft Corporation, Mar. 28, 2003, http://technet.microsoft.com/en-us/library/cc785914.aspx.

msdn, Backing Up and Restoring System State Under VSS, Microsoft Corporation, May 7, 2009, http://msdn.microsoft.com/en-us/library/aa381498(VS.85).aspx.

Microsoft Help and Support, Windows Registry Information for Advanced Users, Feb. 4, 2008, http://support.microsoft.com/kb/256986/)%20Microsoft%20Windows.

* cited by examiner

*Primary Examiner* — Jung Kim
*Assistant Examiner* — Ngoc D Nguyen
(74) *Attorney, Agent, or Firm* — Myers Bigel Sibley & Sajovec, P.A.

(57) ABSTRACT

A method and system for protecting computer system state in one aspect generates signatures associated with system dump data, compares the signatures with those of the previous system dump data. Only those system dump data whose signatures are different from the previous dump are transferred for storing.

13 Claims, 4 Drawing Sheets

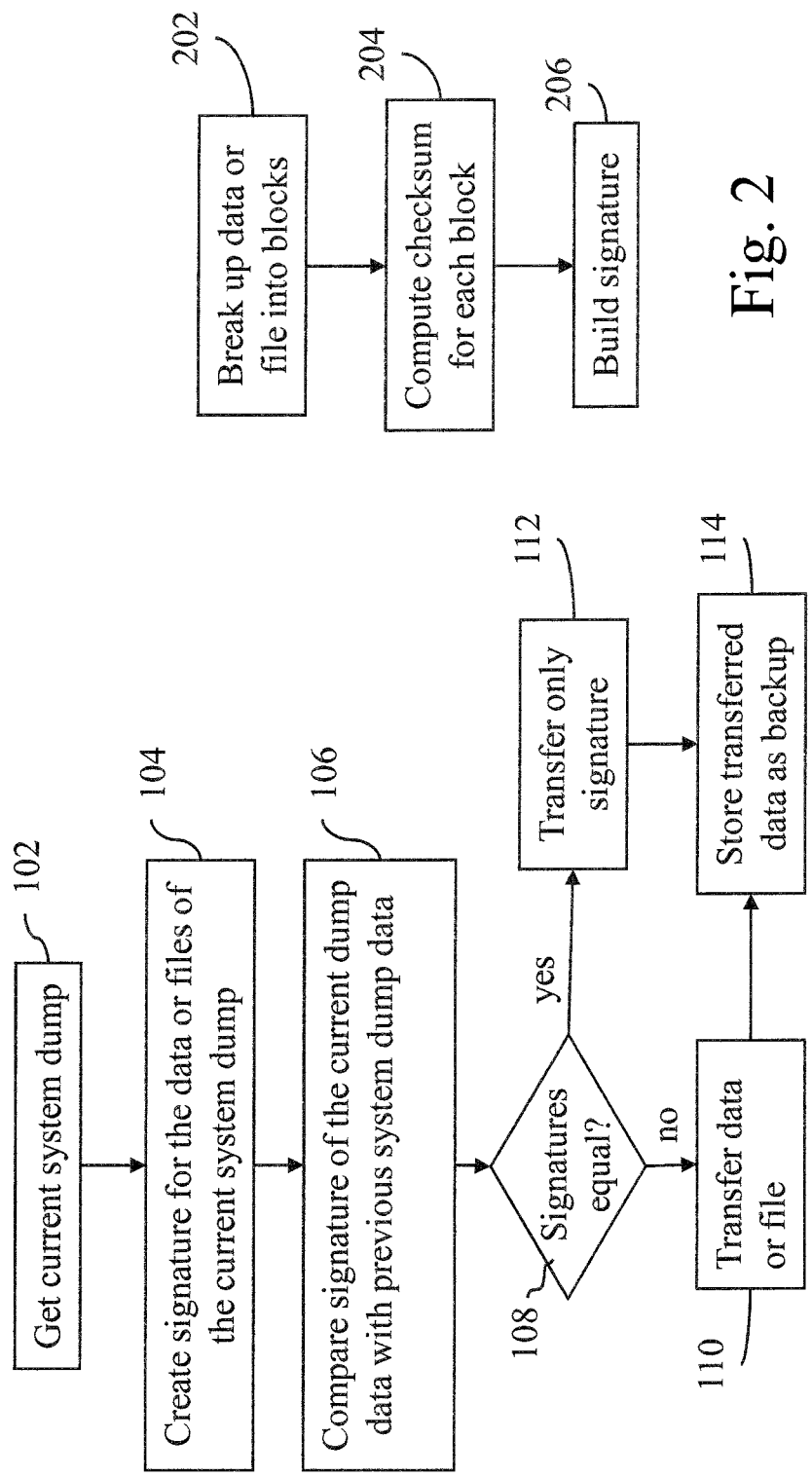

US 8,667,328 B2

SYSTEM AND METHOD FOR PROTECTING WINDOWS SYSTEM STATE

FIELD OF THE INVENTION

The present disclosure relates generally to computer systems, and more particularly to protecting computer system states.

BACKGROUND OF THE INVENTION

Computer system state refers to the state of computer's operating system and its configuration at a given time. For instance, system state data may include system components such as the registry, COM+ Class Registration database, the files under Windows™ file protection, and boot files. Microsoft™ Windows™ counts system registry together with system databases and operating system ("OS") files as "System State." A system state may be backed up and recovered by storing and recovering the data that make up the system state, for instance, for system protection. Microsoft™ Windows™ provides Volume Shadow Copy Service (VSS) application programming interfaces (APIs) as a standard way to backup and recover the system state information.

Windows™ system state data can grow very large in size. For example, a typical Windows™ Server 2008 system has data size that is larger than six gigabytes (GB). A system dump using VSS API produces a long list of all the files in that large data. A normal backup solution requires protection of system state in daily or even hourly basis. The large size of the system state dump can impose a burden on the backup software that needs to transfer data through network and store the data in a backup server, and for example, on storage media such as disk or tape.

BRIEF SUMMARY OF THE INVENTION

A system and method for protecting computer system state are provided. The method, in one aspect, may comprise retrieving a plurality of files associated with current system state of a computer system and generating a signature for each of the plurality of files. The method may also include comparing the signature of a file of the current system state to a signature of a corresponding file of a previous system state. The method may further include transferring the file of the current system state if the signatures are different, and transferring only the signature of a file of the current system state if the signatures match.

A system for protecting system state of a computer system, in one aspect, may comprise a processor operable to perform a system dump periodically and create data representing system state at the time of the system dump. The system may also include a processing module operable to create a plurality of signatures associated with a plurality of files of said data representing system state. The processing module may be further operable to compare the signatures with signatures of corresponding files of data from a previously performed system dump. The processing module may be further operable to transfer a file if signature corresponding to the file is different from signature corresponding to a previous dump of the file.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a flow diagram illustrating a method of the present disclosure in one embodiment.

FIG. 2 is a flow diagram illustrating the details of creating signatures for data dump in one embodiment of the present disclosure.

DETAILED DESCRIPTION

Figure 3:
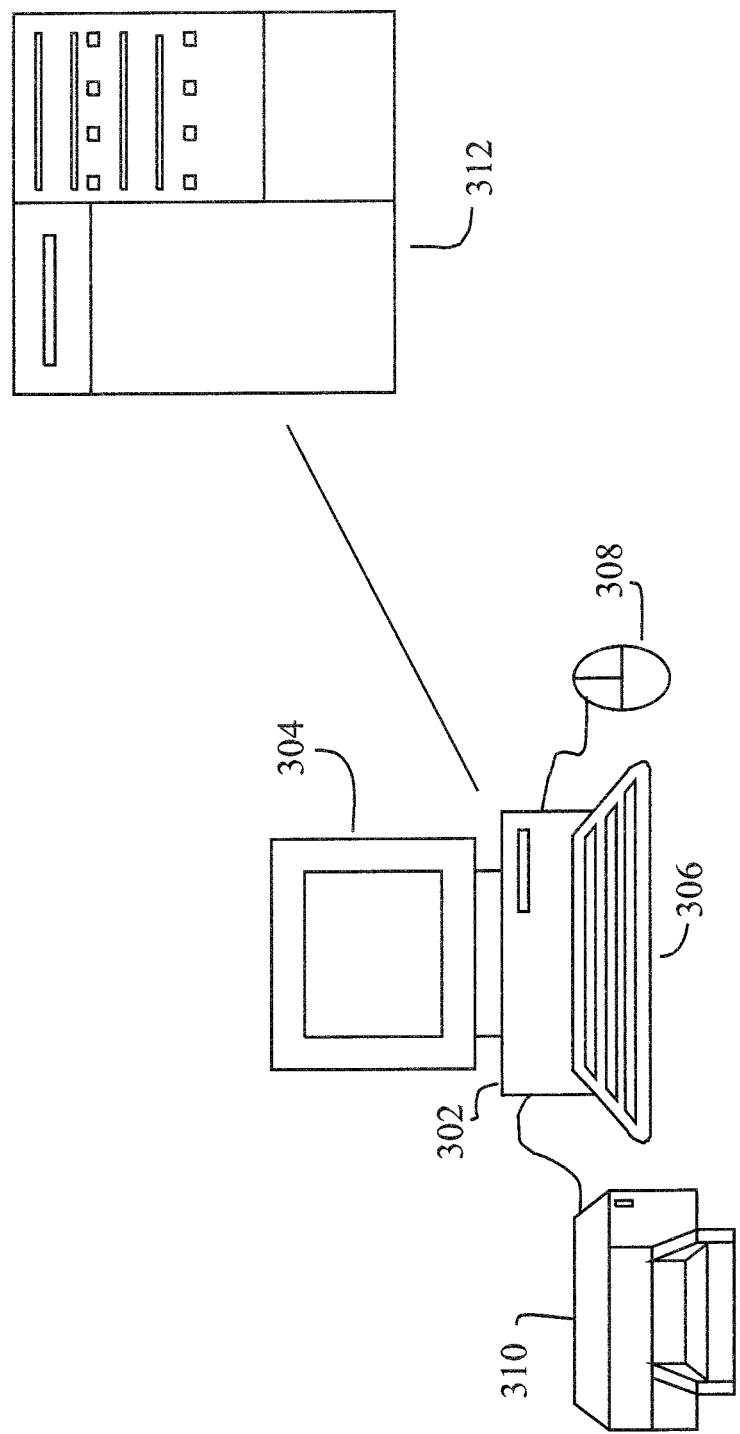
FIG. 3 is a diagram illustrating components of a system of the present disclosure in one embodiment.

A system and method for protecting system or computer data are provided. Compared to the conventional or known methods, the system and method of the present disclosure, in one aspect, require less data to be transferred over the network from the machine being protected to the machine that is storing the system state data. The system and method of the present disclosure also may use less storage space in the backup server or servers compared to the conventional or known methods.

The Windows™ system state may include a registry, COM+ database, and system binary files under "Windows\system32" and other directories. System state data contains many elements of system's configuration that can be used to recover the system from a failure and restore the system to the state before the failure occurred. In Windows™ Server 2008 system, for example, the system binary files can occupy over six gigabytes of disk space. However, many of the system configuration files may not change frequently. Thus, there may not be many system binary files that have changed between one backup to the next backup. Further, while registry files and COM+ databases change over time, the changes in the actual content are not large. Windows™ domain controllers and other server roles have databases, like Active Directory directory service, treated as system states. Those databases behave similarly as the registry and COM+ database, i.e., they change over time, but the actual amount of data that is changed may not be large.

In one aspect of the present disclosure, the method and system generates the signatures of all files involved every time the system performs a dump of a system state. The signatures are then recorded or stored. VSS API, for instance, may be used to dump a system state. Signature of a file may include the file name, size, last modification time and other information which can help identify whether a file has been changed since the backup of the last system dump. The next time the system state dump occurs, the signatures of the new files in the current system dump are compared with the signatures of the files of the previous dump to determine what has changed. Those files or data that is determined to have been changed compared to the last dump are then transferred to a backup system or server or the like, for backup. If the files or data are determined to have not changed since the last dump, only their signatures are transferred to the backup server so that the server can use those files from its local copy.

Thus, initially, signatures of all files of an initial dump may be maintained at a local system, for instance, at its local storage. The initial full system dump, i.e., all the files and/or data of the initial system dump are also stored at one or more backup systems. In this disclosure, backups are also referred to as synchronization. An initial backup would be a full backup of the system dump files and/or data. At each subsequent backup (also referred to as subsequent synchronization) of system dump files and/or data, signatures of those files and/or data are generated and compared with the signatures corresponding to the previous backup data. The local system stores the signatures corresponding to the files of the most current dump. The backup server or system stores a one or more dumps of files and signatures. For instance, the backup server may include a full dump of files, and multiple dumps of files and signatures of subsequent backups (or synchronizations). The count of dump is based on how many backups (or synchronizations) are performed.

For registry, COM+ and other database files and other files, the system and method of the present disclosure in one embodiment may perform a block level comparison to determine exactly which parts of the file has changed, and transfer only the changed part or parts. In one aspect, comparing at the block level may include dividing the file into data blocks, for instance, based on the knowledge of file's structure.

Different methods may be implemented for dividing a file into data blocks. One method is to read in the file data and split it into multiple logical blocks, for example, of predetermined size, for example, four kilobytes (KB), and calculate signatures for each block. Signatures may be computed using algorithms such as MD5 digest. Other algorithms may be used, for example, that generate a hash value, a checksum or the like to represent the signature of a file. The signatures are then saved in the local storage. When comparing with the last dump, a file may be compared block by block using the signature of each block. That is, the signatures of corresponding blocks are compared. The blocks whose signatures are different from the last dump are determined as having changed since the last backup, and those blocks are transferred to a server or backup system for storage. The blocks of a file may be associated with logical block numbers for indicating which blocks have changed and the actual data change. Other tracking mechanisms may be utilized to track the file block structure and changed blocks.

In addition, a file's block map representing a data block may be obtained, established or constructed for comparison. For instance, the system and method of the present disclosure in one embodiment may calculate a checksum using an algorithm such as MD5 for each data block. Any other algorithm may be utilized. A block map may be a structure representing a data block and may include information such as the block start position, size, and checksum. By comparing new block map of the file with the file's original block map or previously backed up block map, it can be determined which block has changed. Only those files whose block map has changed are transferred in one embodiment. This way, the system and method in one embodiment may reduce the amount of data transfer for large database or number of files that only has relatively small number of changes.

FIG. 1 is a flow diagram illustrating a method of the present disclosure in one embodiment. At 102, data or files from the current system dump are retrieved. System dump may be performed either manually or automatically, for example, on a periodic basis or otherwise. For instance, VSS API may be invoked to create the system dump. Data or files created from the system dump then may be evaluated for backup as follows. At 104, signatures for the data or files of the current system dump are generated. A signature may be a checksum or hash value that represents a file. Another example of a signature and a method of creating a signature is described with reference to FIG. 2. Referring to FIG. 1, at 106, the signatures of the data or files of the current system dump are compared to the signatures of the corresponding data or files of the last system dump. The signatures of the last system dump may be stored or saved in a predetermined or designated location or folder or directory or the like in the system, for example, to be retrieved for comparison. At 108, if the signatures of the data or file of the current and the last system dump are different, the data or file is designated for transferring for storage or backup at 110. Otherwise, if it is determined that the signature of the data or file of the current system dump is the same as that of the previous dump of the corresponding data or file, only the signature of the data or file is designated for transferring for storage or backup at 112. The steps of comparison may be repeated for all data or files in the system dump. The actual transferring of the files and/or data may occur as bulk transfer or other types of transfer, and may depend on design or implementation choice. At 114, the backup server or the like receiving the current system dump data or file, and/or signatures stores or backs-up the received data, files and/or signatures.

Figure 5:
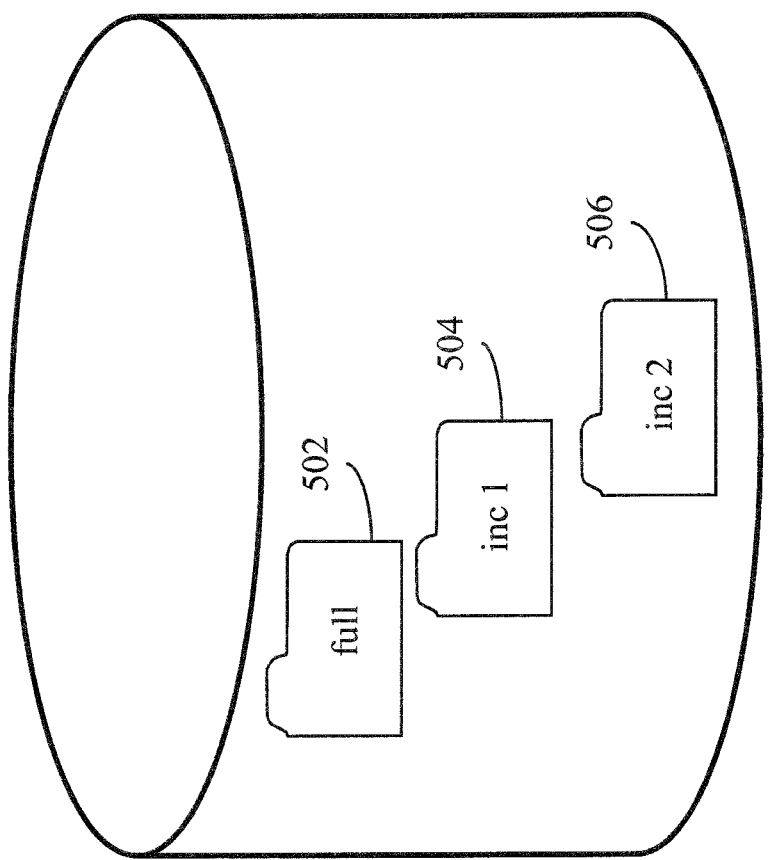
FIG. 5 illustrates an example of file organization in one embodiment of the present disclosure.

The backup server or the storage system may organize the backed up data and signatures as follows. FIG. 5 illustrates an example of file organization at one or more backup servers. A full backup data is stored in a folder or location 502 (e.g., "full"). In one embodiment, the fall backup data in the folder 502 does not include signatures. The next time the data is backed up, the backup data is saved in another folder or location 504 (e.g., "inc1"). This backup data may contain data (and/or files) and signatures. The data saved in this folder 504 is based on comparison with the data in the "full" folder 502, therefore, the name of the compared-to folder 502 (e.g., "full") or link to the folder or the like is also saved in the "inc1" folder 504. The name of the folder 502 is used to search for data corresponding to the signature stored in the folder 504. At another next backup, the data received for backing up is stored in yet another folder or location 506 (e.g., "inc2"). Since this backup is based on comparison with the data in the "inc1" folder 504, the name of that folder 504, for example, "inc1" or a link to the folder or the like is also saved. The folders 502, 504, 506 may be organized in a hierarchical relationship, for example, as the folder 502 being the parent of the folder 504, the folder 504 being the parent of the folder 506, etc. Flat file relationship or other file structure and/or organization may be used. It should be understood that the example of the file structure shown in FIG. 5 is only for illustrative purposes and does not in any way limit the file organization in the present disclosure to only such structures.

In one embodiment, the system that is being backed up (herein also referred to as an agent station, local station, local machine) stores only the signatures corresponding to all files of the latest backup, for instance, in a folder or location at the local station. Storing only the signatures at the local station reduces the network overhead and speeds up the comparison. For instance, the signatures of the system dump files are generated and compared with the locally stored signatures to determine which file has been changed. If any change is detected, the system and method of the present disclosure transfers the changed file to the backup server or system, and updates the local storage with the new signature.

For recovering the data or files, the system and method of the present disclosure may present a user with the "time stamp" of each file. The time stamp represents the time of the last backup and is mapped to or corresponds to one of the backup folders on a backup server, for example, a "full" or "incx" folder. All files may be listed, and the user may select any one or more of the listed files for recovery. When a file of a "time stamp" is selected for restoring, the system and method of the present disclosure in one embodiment searches the folder mapped to the selected "time stamp" of the file and determines whether the actual file exists in the folder. If not, the system and method of the present disclosure in one embodiment searches the folder of a previous backup to look for the actual file. If this folder also does not contain the actual file, the search procedure is repeated in yet another previous backup folder until the actual file is found. If the folders are hierarchically structured or arranged, the search or lookup procedure described above involves searching the parent folders or directories, for instance, one level up each time the actual file is not found (i.e., only signatures of the files are found) in the current folder.

In one aspect of the present disclosure, by allowing a user to select a "time stamp" for storing, user need not know exactly what files are needed for recovery. Rather, the user only needs to know the "last good time" of the system configuration and restore the data associated with that time.

Yet in another aspect, the local machine that is being backed up and the backup machine, for example, a computer server that stores the backup data, may interact periodically to check that the data on the server and the local machine are in sync. That is, a check may be performed to determine that the signatures of the data dump in the local machine match with the signatures of the data dump stored in the backup machine. If not, an initial synchronization may be performed by performing a system dump and generating signatures of the system dump. The signatures would be stored in the local machine while the actual files and data associated with the system dump would be transferred to the backup machine for storage.

FIG. 2 is a flow diagram illustrating an example of a signature and the details of creating those signatures for data dump in one embodiment of the present disclosure. At 202, the data or file from the system dump is broken up into blocks. At 204, a checksum for each block is computed. At 206, a block map for the file is composed or created. The block map may include a list of structures representing each block of the data or file with information of block start position, size, and checksum. The block map makes up the signature for the data or file.

Figure 4:
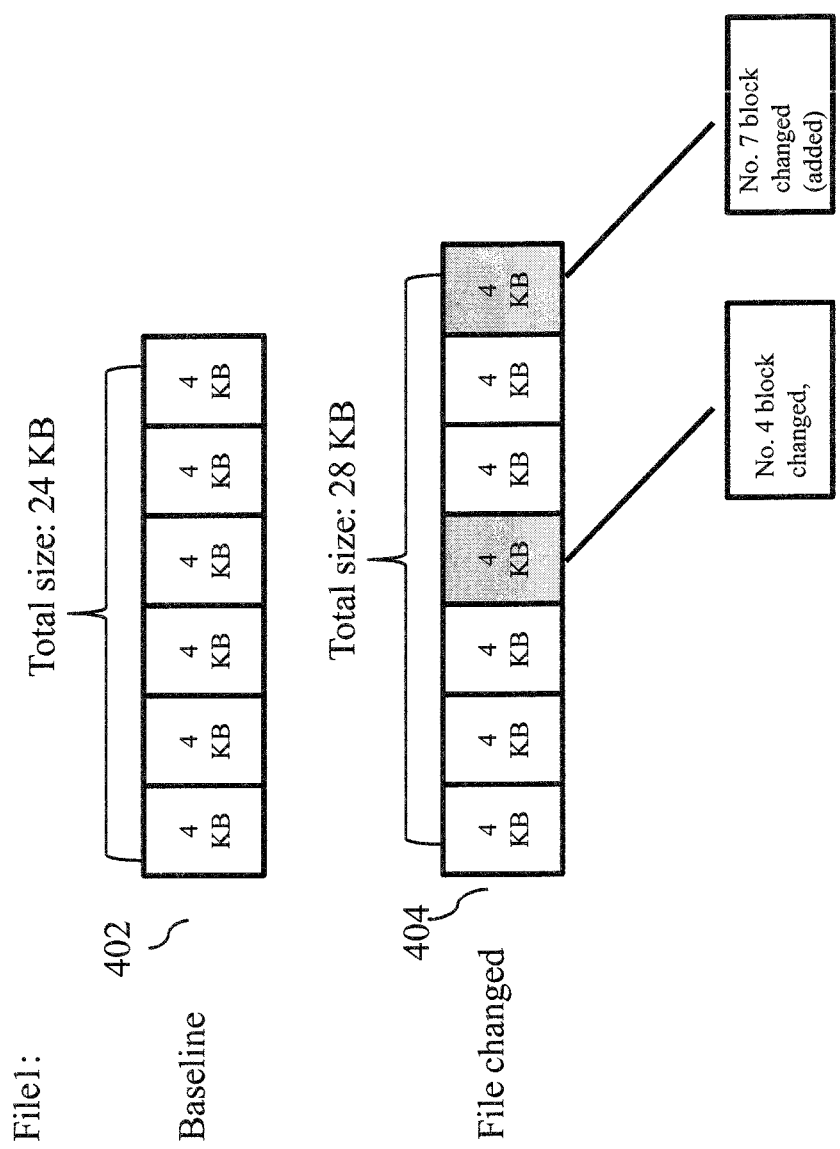
FIG. 4 illustrates an example of file blocks.

FIG. 4 shows an example of the data and/or files divided into smaller blocks. The baseline file 402 represents a file before a change. It is broken up into six blocks of 4 KB each as an example. The file after it is changed is shown at 404. This file is also divided into 4 KB size blocks. The comparison of the block maps of the baseline file 402 and the changed file 404 determines that block 4 was changed and block 7 was added. In this example, since the signature of the file compared with the signature of the previous version of the file is different, the file is designated for transfer for backup. In one aspect, the entire file is transferred to the backup server or system. In another aspect, only those blocks that have changed and information on the change may be transferred to the backup server or system.

FIG. 3 is a diagram illustrating components of a system of the present disclosure in one embodiment. The systems and methodologies of the present disclosure may be carried out or executed in a computer system that includes a processing unit 302, which houses one or more processors and/or cores, memory and other systems components (not shown expressly in the drawing) that implement a computer processing system. The computer system may include media, for example a hard disk, a compact storage medium such as a compact disc, or other storage devices, which may be read by the processing unit 302 by any techniques known or will be known to the skilled artisan for providing the computer program product to the processing system for execution.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or other pointing device or the like. The computer processing system may be also connected or coupled to one or more peripheral devices such as the printer 310, scanner (not shown), speaker, and any other devices, directly or via remote connections.

The computer processing system may be connected or coupled to one or more other processing systems such as a server 312, other remote computer processing system, network storage devices, via any one or more of a local Ethernet, WAN connection, Internet, etc. or via any other networking methodologies that connect different computing systems and allow them to communicate with one another. The system dump data and/or signatures as computed above may be backed up or stored on a backup server such as the one shown at 312, storage network, or on a detachable media devices such as DVD, CD's, and other storage devices.

The various functionalities and modules of the systems and methods of the present disclosure may be implemented or carried out distributedly on different processing systems or on any single platform, for instance, accessing data stored locally or distributedly on the network.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for protecting computer system state, comprising:
    retrieving a plurality of files associated with a current system state of a computer operating system at a time of a system dump;
    generating, using a processor, a respective signature for each of the plurality of files, wherein the respective signature comprises information indicative of whether a corresponding one of the plurality of files has changed since a previous system dump;
    comparing, using the processor, the signature of a file of the current system state to a signature of a corresponding file of a previous system state at a time of the previous system dump;
    transferring the file of the current system state responsive to the comparing indicating that the signatures are different; and
    transferring only the signature of the file of the current system state responsive to the comparing indicating that the signatures match.

2. The method of claim 1, wherein transferring further comprises transferring to a backup computer system for storage.

3. The method of claim 1, wherein generating comprises:
    determining a checksum value for each of the plurality of files; and
    creating a signature comprising the checksum value and size of a corresponding file.

4. The method of claim 1, wherein generating comprises:
    breaking up the file into a plurality of blocks;
    determining a checksum value for each of the plurality of blocks; and
    creating a signature comprising the checksum value for each of the plurality of blocks, start position of said each of the plurality of blocks, and size of said each of the plurality of blocks, said creating performed using one of an MD5 digest and a hash value algorithm.

5. The method of claim 1, where retrieving a plurality of files associated with current system state of a computer system comprises invoking a function to create the system dump of said current system state.

6. A system for protecting system state of a computer system, comprising:
    a processor to perform a system dump periodically and create data representing system state of an operating system of the computer system at the time of the system dump; and
    a processing module to create a respective signature for each of a plurality of files of said data representing system state, wherein the respective signature comprises information indicative of whether a corresponding file has changed since the previous system dump,
    wherein the processing module is further to compare the signatures with signatures of corresponding files of data from a previously performed system dump, to transfer the file if the signature corresponding to the file is different from the signature corresponding to a previous dump of the file, and to transfer only the signature associated with the file when the signature corresponding to the file is same as the signature corresponding to a previous dump of the file.

7. The system of claim 6, wherein the signature comprises checksums of a plurality of blocks of a file, positions of the plurality of blocks in the file, and sizes of the plurality of blocks.

8. The system of claim 6, further comprising:
    a storage system to receive and store a plurality of files and signatures associated with a system dump.

9. A program storage device readable by a machine, tangibly embodying a program of instructions executable by the machine to perform a method of protecting computer system state, comprising:
    retrieving a plurality of files associated with current system state of a computer operating system at a time of a system dump;
    generating a respective signature for each of the plurality of files;
    comparing the signature of a file of the current system state to a signature of a corresponding file of a previous system state at a time of a previous system dump;
    transferring the file of the current system state responsive to the comparing indicating that the signatures are different; and
    transferring only the signature of the file of the current system state responsive to the comparing indicating that the signatures match,
    wherein the signature comprises information indicative of whether the file of the current system state has changed since the previous system dump.

10. The program storage device of claim 9, wherein transferring further comprises transferring to a backup computer system for storage.

11. The program storage device of claim 9, wherein generating comprises:
    determining a checksum value for each of the plurality of files; and
    creating a signature comprising the checksum value and size of the file, said creating performed using one of an MD5 digest and a hash value algorithm.

12. The program storage device of claim 9, wherein generating comprises:
    breaking up the file into a plurality of blocks;
    determining a checksum value for each of the plurality of blocks; and
    creating a signature comprising the checksum value for each of the plurality of blocks, start position of said each of the plurality of blocks, and size of said each of the plurality of block.

13. The program storage device of claim 9, where retrieving a plurality of files associated with current system state of a computer system comprises invoking a function to create the system dump of said current system state.

* * * * *